(No Model.)
W. R. CLARKSON.
RATCHET BIT BRACE.
No. 286,388. Patented Oct. 9, 1883.
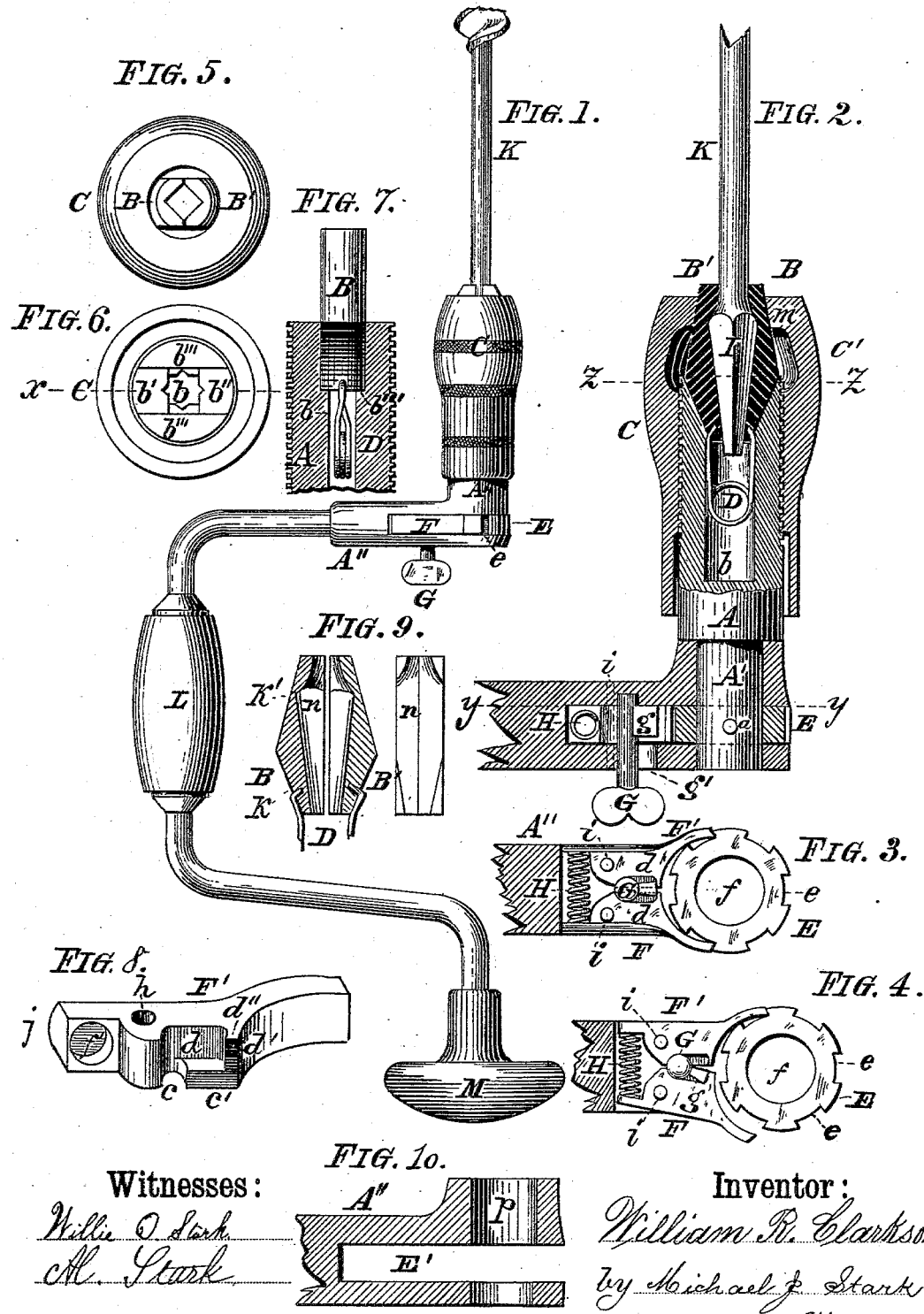
Witnesses:
Willie O. Stark
M. Stark
Inventor:
William R. Clarkson,
by Michael J. Stark
Attorney.

UNITED STATES PATENT OFFICE.

WILLIAM R. CLARKSON, OF BUFFALO, NEW YORK.

RATCHET BIT-BRACE.

SPECIFICATION forming part of Letters Patent No. 286,388, dated October 9, 1883.

Application filed July 18, 1883. (No model.)

*To all whom it may concern:*

Be it known that I, WILLIAM R. CLARKSON, of Buffalo, in the county of Erie and State of New York, have invented certain new and useful Improvements on Ratchet Bit-Brace; and I do hereby declare that the following description of my said invention, taken in connection with the accompanying sheet of drawings, forms a full, clear, and exact specification, which will enable others skilled in the art to which it appertains to make and use the same.

My present invention has general reference to bit-stocks; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a side elevation of a bit-stock embracing my new invention. Fig. 2 is a longitudinal sectional elevation in line $x\ x$ of Fig. 6. Figs. 3 and 4 are transverse sectional plans in line $y\ y$ of Fig. 2. Fig. 5 is a plan of the nut and the jaws. Fig. 6 is a transverse sectional plan in line $zz$ of said Fig. 2. Fig. 8 is a perspective view of one of the pawls or dogs. Fig. 7 is a sectional elevation of the upper portion of the socket A. Fig. 9 shows detached views of the jaws, and Fig. 10 is a sectional elevation of the sweep A″.

Like parts are designated by corresponding letters of reference in all the various figures.

A in these drawings represents the usual socket or screw portion of a bit-brace. This socket has on its lower part a reduced portion or shank, A′, and on its upper portion an external screw-thread, wherewith engages an internal screw-thread located in the nut C, said nut being of the well-known and approved construction, and clearly illustrated in said drawings. In this socket A there is an oblong recess having converging sides $b'\ b''$, respectively, (see Fig. 6,) terminating in an angular hole, $b$, said recess being fitted to receive a pair of jaws, B B′, of peculiar construction. These jaws have double converging sides K K′, Fig. 9. The lower portion, K, corresponds in its taper form with the converging sides $b'\ b''$ of said recess, while the upper part, K′, corresponds with the conical head $m$, Fig. 2, of said nut C. The lower part, K, of these jaws are connected together by means of a wire coil-spring, D, so arranged as to keep the two jaws apart, to enable them to readily receive the shank I of an ordinary bit, K, when the nut is sufficiently unscrewed for this purpose, said spring D occupying the hole $b$ in the socket A, as clearly illustrated in Fig. 2. In the opposing faces of these jaws B are cut V-shaped recesses $n$, corresponding in shape with the contour of the shank of said bit, so as to readily take the said shank and securely hold it in position.

In the sweep of the brace, A″, Fig. 10, there is a slotted aperture, E′, giving to this part of the brace a bifurcated shape, said aperture E′ being adapted to receive the "gear" or ratchet wheel E, having an aperture, $f$, fitting said shank A′ of the socket A, said ratchet-wheel being fastened to said shank by means of a pin, $a$, Fig. 2, or any other convenient manner. In the slotted aperture E′ are furthermore located two pawls or dogs, F F′, having apertures $h$, Fig. 8, by means of which and pins $i\ i$, Fig. 4, they are pivoted within said aperture E′. These dogs have each in their faces a semicircular groove, $c$, and above the bridge or ledge $c'$ a recess, $d$, and shoulder, $d'$, said dogs terminating in the shank $j$, having a recess or depression, $f'$, for the reception of the ends of a coil-spring, H, placed between the shanks of the two dogs, so as to keep their tail ends apart.

In the lower part of the fork of the socket A″ is a key-hole, $g'$, for the passage of a key, G, by means of which the dogs F F′ are manipulated, as hereinafter set forth and described. This key G rests, with its beard $g$, Fig. 2, upon either one or both of the ledges $c'$ on the dogs F F′, and is thereby prevented from ever falling out of its proper place, the spring H between the two dogs being of such length as not to allow the dogs to open sufficiently to allow the key to pass said ledges with its beard $g$. This construction of the dogs F F′ and their co-operation with the key G form an essential part of my invention, since without this arrangement a ratchet-brace cannot well be operated successfully.

It will now be readily observed that when the key G is in its normal position (shown in Fig. 3) both dogs F F′ engage with the ratchet-wheel E to prevent it from turning; but as soon as the key G is turned, so as to cause its beard $g$ to displace one or the other of these jaws or dogs, the one so displaced will have liberated the ratchet-wheel to allow it being revolved in that direction which such dog opposes when engaged with said ratchet-wheel. It is therefore evident that this brace can be converted into a ratchet-brace, as well as into a right or left ratchet, by simply manipulating the key G, and that the mechanism for attaining such results is at once as effective as it is simple in construction and operation.

To keep the dogs F F' disengaged, (one at the time,) the end $d''$ of the recess $d$ is slightly curved, so as to catch on the beard $g$ in a manner readily understood.

It will be further understood that in virtue of the double incline of the jaws B B', operating in conjunction with the converging sides $b' b''$ of the socket A, and the conical head $m$ of the nut C, the bit K is always held centrally in the said jaws, no matter how thick the square shank I on said bit may be, and that the jaws always open parallel with each other on that account. This construction has the beneficial effect of preventing the wearing in of grooves or shoulders on the tapering surfaces of said jaws, owing to the fact that the nut C will not be always bearing upon the sides of said jaws on the same spot, which would be the case if the jaws were differently constructed.

To insert a bit into this brace, the nut C is unscrewed until the jaws B B' have opened sufficiently to allow the taper shank I to enter. The bit is then pushed downward until said shank has passed through said jaws with its point and entered the angular hole $b$ in the socket. This will cause the bit to "center," so that if the nut C is now screwed up the jaws B B' will close upon said shank, and thereby securely embrace the same and holding it perfectly centered between them.

It is obvious that the ratchet mechanism as described may be applied to ratchet-drills, screw-drivers, and similar tools, in a manner readily comprehended, without change or modification, and that the entire device is so simple in construction and so readily reproduced in large quantities as to render the same a desirable article for manufacturers of this class of tools.

It is perhaps superfluous to say that in manufacturing this bit-stock I can follow the methods now usually employed for producing the sweep portion by applying the handle to a plain rod, then bending this rod cold (or otherwise) into the desired shape, and finally finishing it in the well-known manner.

I am aware that heretofore bit-stocks have been made in which the screw portion of the "socket" is bifurcated to receive a pair of jaws having tapering portions on the upper and lower ends, said jaws being kept apart by a spring located between them, an instance of such construction being given in the patent of J. W. Anthoine, December 21, 1875. This construction differs from my present invention, inasmuch as my screw portion is not bifurcated or slotted to receive the jaws, which slotting has a tendency to weaken the socket, but is provided with an angular recess the sides of which are converging, thus preserving nearly the entire strength of the material of which the socket is constructed. Nor are my jaws held apart by a spring located between them, but they are virtually pushed together by a spring attached to the exterior of said jaws. These differences are very essential, inasmuch as a far superior and more desirable article of manufacture are produced thereby than that shown in the patent named.

Having thus fully described my invention, I claim as new, and desire to secure to me by Letters Patent of the United States of America, the following claims:

1. As an improved article of manufacture, a bit-stock having the socket A, provided with an angular central recess, $b$, having converging sides $b' b''$, the two jaws B B', having the double converging sides K K, fitting the converging sides $b' b''$, on the lower ends, and the tapering head $m$ of the nut C, on the upper end, said jaws being provided with depressions $n$, and held together by means of a spiral spring, D, the ends of which pass to the outside of the lower portion of said jaws B B', substantially as hereinbefore set forth and described.

2. In ratchet bit-braces and similar implements, a pair of dogs for the ratchet-wheel, said dogs being adapted for manipulations with a removable bearded key, substantially as described, said key being locked in position by means, substantially as stated, attached to or forming part of said dogs, substantially in the manner as and for the object specified.

3. In ratchet bit-braces, a pair of dogs, F, each being provided with a tail, $j$, circular groove $c$, shoulder or ledge $c'$, recess $d$, having curved end $d''$, and the shoulder $d'$, said dogs being adapted for operation in conjunction with a bearded key and a suitable ratchet wheel or gear, substantially in the manner as and for the object specified.

In testimony that I claim the foregoing as my invention I have hereunto set my hand in the presence of two subscribing witnesses.

WILLIAM R. CLARKSON.

Attest:
 MICHAEL J. STARK,
 JOHN C. DUERR.